United States Patent
Lee (12)

(10) Patent No.: US 10,037,488 B1
(45) Date of Patent: Jul. 31, 2018

(54) MOBILE DEVICE WITH IMPROVED CHARGING CAPABILITY AND CASEMENT STRUCTURE

(71) Applicant: Koamtac, Inc., Princeton, NJ (US)

(72) Inventor: Hanjin Lee, Skillman, NJ (US)

(73) Assignee: KoamTac, Inc., Princeton, NJ (US)

( * ) Notice: Subject to any disclaimer, the term of this patent is extended or adjusted under 35 U.S.C. 154(b) by 0 days.

(21) Appl. No.: 14/999,687

(22) Filed: Jun. 15, 2016

(51) Int. Cl.
| | |
|---|---|
| *G06K 19/06* | (2006.01) |
| *G06K 19/077* | (2006.01) |
| *H02J 7/00* | (2006.01) |
| *H01R 35/04* | (2006.01) |

(52) U.S. Cl.
CPC ....... *G06K 19/07749* (2013.01); *H01R 35/04* (2013.01); *H02J 7/0052* (2013.01); *H02J 2007/0062* (2013.01)

(58) Field of Classification Search
CPC ......... G06K 7/10; B29C 45/00; H02J 7/0052; H02J 2007/0062; H01R 35/04
See application file for complete search history.

(56) References Cited

U.S. PATENT DOCUMENTS

| | | | | |
|---|---|---|---|---|
| 3,655,421 A | * | 4/1972 | Long ........................ | B05D 5/06 427/280 |
| 4,292,827 A | * | 10/1981 | Waugh ..................... | B05D 1/30 29/412 |
| 2007/0051652 A1 | * | 3/2007 | Tilton ................. | B65D 73/0092 206/462 |
| 2010/0082444 A1 | * | 4/2010 | Lin ....................... | G06Q 20/042 705/17 |
| 2012/0193252 A1 | * | 8/2012 | McDonough ...... | G11B 33/0427 206/308.1 |
| 2012/0273541 A1 | * | 11/2012 | Zwach .................... | A45C 11/00 224/615 |
| 2014/0371384 A1 | * | 12/2014 | Fischer .................. | B05D 3/062 524/555 |
| 2015/0307723 A1 | * | 10/2015 | Breton ................. | C09D 11/322 523/322 |
| 2016/0042202 A1 | * | 2/2016 | Murray ................... | G06F 1/203 320/108 |
| 2017/0313118 A1 | * | 11/2017 | Pyo .................... | B42D 15/0093 |

* cited by examiner

*Primary Examiner* — Claude J Brown

(74) *Attorney, Agent, or Firm* — Gorman Law Office

(57) ABSTRACT

The present invention relates to an apparatus and method offering an improved approach to charging mobile devices, such as an illustrative specialized compact bar code scanner, without need for cumbersome wires or charging cradles, through an innovative casement having an integrally contained, or recessed (flush-mounted) swing-out USB connector which avoids severing or disconnection of wires between the swing-out USB connector and the mobile device over the course of repeated use. The present invention also relates to an improved casement structure for mobile devices and payment processing module encased therein.

5 Claims, 3 Drawing Sheets

FIG. 1A
FIG. 1B
FIG. 1C
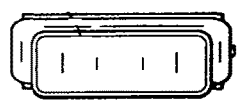
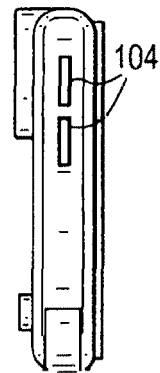
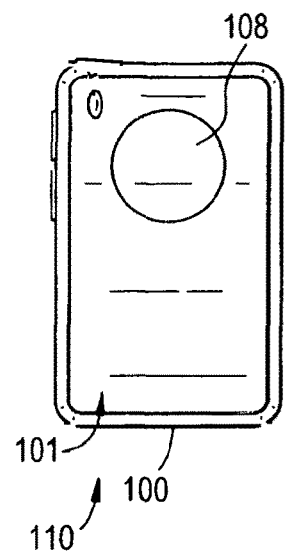
FIG. 1D
FIG. 1E
FIG. 1F
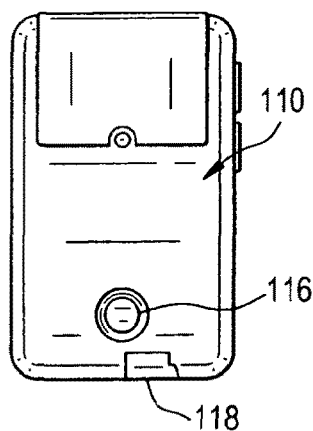
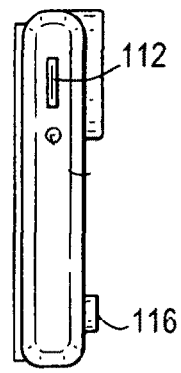
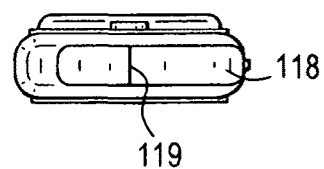

FIG. 2A
FIG. 2B
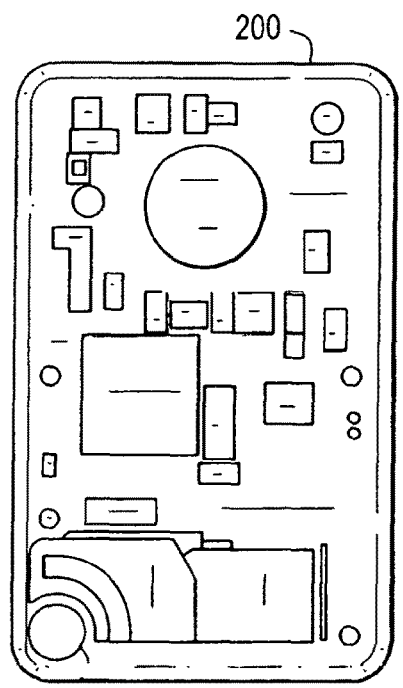
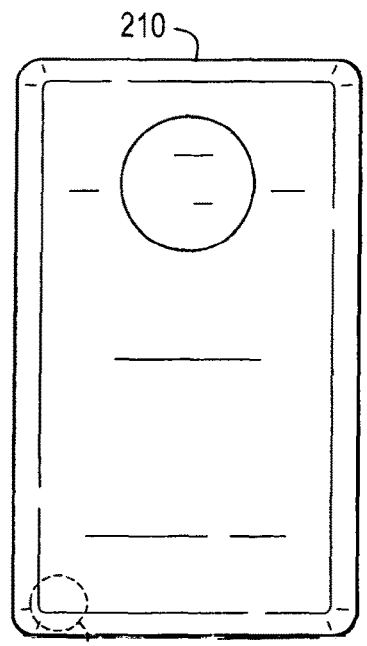

MOBILE DEVICE WITH IMPROVED CHARGING CAPABILITY AND CASEMENT STRUCTURE

The present application is a divisional of U.S. patent application Ser. No. 14/080,623, filed on Mar. 19, 2014, which itself is a non-provisional of U.S. Pat. Applic No. 61/926,801, filed on Jan. 13, 2014. Priority based upon each of the above is hereby claimed, and the disclosures of each are hereby incorporated by reference in their respective entireties.

1. FIELD OF THE INVENTION

The present invention relates to an apparatus and methods for a mobile device with improved charging capability and improved casement structure. In one embodiment, the mobile device may be an automatic identification ("auto ID") device such as a portable bar code scanner, a mobile phone, tablet, or other mobile electronic device that requires charging. In an additional embodiment, provision is also made for manufacturing of an auto ID device such as a portable bar code scanner having the with improved charging capability and improved casement structure and a module for Bluetooth® Low Energy (LE)-type beacon for geo-location and payment system integrations.

2. DISCUSSION OF THE RELATED ART

Recently, mobile devices such as mobile phones, smart phones, tablets, and the like are widely used, and are normally charged through a charging pin and cord (plug in charger), or through a charging cradle.

However, such mobile devices have limited battery life, and the ability to charge is often reliant upon the carrying around of bulky charging stations or a charging pin and cord (plug in charger). If one of these separate accoutrements is lost or forgotten, then such mobile devices cannot be charged.

Current approaches for using any of the above mobile devices have therefore been hitherto limited to the above, and accordingly, previously known devices do not offer solutions for an alternate, portable means of charging that does not rely on external charging cables or cradles.

SUMMARY OF THE INVENTION

The present invention relates to an improved method and apparatus for charging mobile devices. More particularly, the present invention is directed to a system and method for providing a USB charging connector that resides within the given mobile device, and because the USB connector is both electronically and physically connected to the mobile device, it may simply be swung out from a flush (recessed) position within the casement of the mobile to expose the USB connector for charging (and optional data connectivity) of the device when connected to another electronic device, such as a PC, laptop, tablet, cell phone, etc. Additionally, both the USB connector electrical connection within the mobile device, as well as the casement of the mobile device itself, is provided in a novel fashion so that the electrical connection (wires) to the USB connector are protected from degradation and cutting when the USB connector is swung from the recessed position inside the device, to an externally exposed position during charging operations. This approach substantially obviates one or more problems due to the aforementioned limitations and disadvantages of the related art.

The proposed invention therefore relates to a novel approach to improving the use of peripheral devices such as auto ID devices, and alternatively, mobile devices, tablets, and the like through an innovative charging scheme involving a novel, pivoting USB connector that can be securely stored when not in use.

Furthermore, in one embodiment, the present invention provides for an improved method and apparatus for forming a novel casement that augments the use of the novel, pivoting USB connector.

Additionally, in one embodiment, the present invention provides for peripheral devices such as auto ID devices to have additional functionality as geo-location and/or payment processing devices through the use of various wireless methodologies, such as Bluetooth® LE beacon-type technology.

Accordingly, the present invention offers the following beneficial advances relating to providing improved charging of a mobile device: (1) provision of a novel, pivoting USB connector that can be protectively covered when not in use; (2) provision of physically hardened wiring for the novel, pivoting USB connector through the use of a reinforcement member for mechanically securing said electrical wires connecting said pivoting USB connector; (3) provision of an anti-snag cutout for preventing electrical wires from destructive abrasion and electrical discontinuity that may occur from angular movement during pivoting USB connector in relation to said mobile device; (4) provision of an improved casement for the mobile device that both provides protective covering for the novel, pivoting USB connector when not in use; (5) provision of the aforementioned improved casement as a customizable case that can be screen printed when attached to a translucent frame that is bonded through ultra-violet (UV) bonding; (6) provision of the aforementioned improved casement with read-out friendly attachment means that permits easy viewing of a screen on the mobile device when hung; and (7) optional provision for mobile devices such as auto ID devices to have additional functionality as geo-location and/or payment processing devices through the use of various wireless methodologies, such as Bluetooth® LE beacon-type technology.

Technical subject matters to be realized by embodiments of the present invention are not limited to the following technical subject matters, and other technical subject matters not mentioned in the following description may be easily appreciated by those skilled in the art to which the present invention pertains, without difficulty. Accordingly, additional advantages, objects, and features of the invention will be set forth in part in the description which follows and in part will become apparent to those having ordinary skill in the art upon examination of the following may be learned from practice of the invention. The objectives and other advantages of the invention may be realized and attained by the structure particularly pointed out in the written description and claims hereof as well as the appended drawings. It is therefore to be understood that both the foregoing general description and the following detailed description of the present invention are examples and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIGS. 1A-1F depict a barcode scanner with swing-out USB connector within one embodiment of the invention, which, when provided in the manner as depicted, would effectuate the novel operations performed between the illustrative barcode scanner and a cooperating mobile device, according to the present invention;

FIGS. 2A-2B depict one embodiment of the invention, of an illustrative front deco (custom designed) cover mounted to a translucent main frame, whereby the front cover and main frame may be affixed to each other through UV bonding that has been effectuated through the translucent main frame, and would effectuate the novel operations as it specifically relates to attaching or detaching the present invention to a mobile device.

DETAILED DESCRIPTION OF THE INVENTION

Figure 3A:
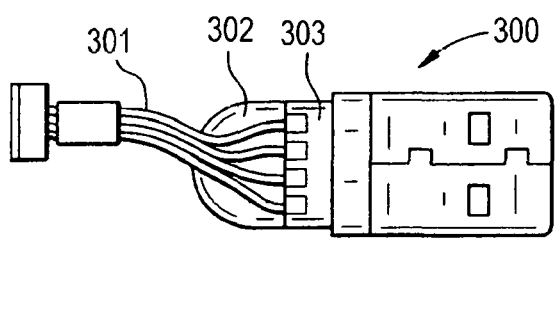
FIGS. 3A-3D depict one embodiment of the invention, specifically of an illustrative swing-out (pivoting) USB connector design with an anti-snag cutout and a reinforcement member.

To achieve the objects and other advantages and, in accordance with the purpose of the invention as embodied and broadly described herein, the proposed invention relates at its broadest level, to an innovative method and apparatus for charging mobile devices through the use of a pivoting, flush mounted USB connector for charging and optional data connectivity, and a cooperative casement for storing the same when not in use is provided. Thus, at its broadest level, one embodiment of the present invention relates to a mobile device with improved charging capability, having at least the following: (a) a mobile device with at least one USB port for electrical connection to another electronic device, wherein the mobile device has a casement and an upper pivot pin end receptacle and a lower pivot pin end receptacle provided at an end of the casement; (b) a pivoting USB connector wherein the pivoting USB connector includes: (i) a pivot pin for physically and electrically connecting the pivoting USB connector to the mobile device, the pivot hinge having a first end with a pin for functional mating with said upper pivot pin end receptacle, and a second end with a pin for functional mating with the lower pivot pin end receptacle on the mobile device; (ii) electrical wires for electrically connecting the pivoting USB connector to at least one USB port on the mobile device; (iii) a reinforcement member for mechanically securing said electrical wires connecting the pivoting USB connector to the USB port on said mobile device; (iv) an anti-snag cutout for preventing the electrical wires from destructive abrasion and electrical discontinuity during angular movement of the pivoting USB connector in relation to the mobile device. Notably, the present invention is amenable to instantiation within mobile devices such as mobile phones, tablets, auto ID devices and the like. The mobile device includes a power port for externally powering the mobile device via the pivoting USB connector, and includes a casement recess for storing the pivoting USB connector when not in use, while the pivoting USB connector has a swing out configuration for swinging out from the recess in the casement of the mobile device when the USB connector needs to be used for charging. Additionally, in one alternative embodiment, the casement of the mobile device includes an attachment hole on one end for vertical viewing of the mobile device when said mobile device is suspended vertically along a display axis.

When provisioned as an auto ID device, the device may comprise at least the following: (a) electronic circuitry for executing auto ID functions; (b) a casement for housing said electronic circuitry, said casement having: (i) a transparent main frame; and (ii) a printed front case ultra-violet (UV) bonded to the transparent main frame or taped to the main frame using double sides tape, or both UV bonded and taped. The printed front case may custom printed with techniques such as silk screening, so as to provide the device with a custom design and finish on the front that is UV cured. To this end, the present invention also relates to a method for manufacturing an auto ID device comprising at least the following steps of: (a) providing electronic circuitry for executing auto ID functions; (b) manufacturing a casement for housing the electronic circuitry, said manufacturing comprising at least the following steps of: (i) ejection or other type of molding or forming a transparent main frame; (ii) affixing the electronic circuitry to said transparent main frame; (iii) ejection molding or other type of molding or forming a front case; (iv) bonding the front case to said transparent main frame though a directed beam of ultra-violet (UV) light through the transparent main frame to a bonding seam connecting the front case and said transparent main frame; and (v) optionally screen printing the front case with custom designs and finish as required, through a UV light curing process.

Reference will now be made in detail to the illustrative embodiments of the present invention, examples of which are illustrated in the accompanying drawings. Wherever possible, the same reference numbers will be used throughout the drawings to refer to the same or like parts. Constituent components and operations of the present invention shown in the drawings will be disclosed only for illustrative purposes of the present invention, such that technical spirit, important constructions and operations of the present invention are not limited to only the following embodiments, and can also be applied to other embodiments.

FIGS. 1A-1F illustrate an example of one illustrative embodiment of the mobile device within the present invention, shown here as inventive auto ID device 100, depicted herein as an exemplary compact bar code reader such as a KDC® 100/200/300 type unit, available from KoamTac® Inc., of Princeton, N.J. Unlike prior art devices that require to use either charging cable or cradle, the present invention improves usability by removing the need to have either a charging cable or charging cradle. Thus, the present invention can charge through the USB connection, and optionally, can provide for data transmission if desired. The device can accordingly be charged and can communicate with a USB connectable host device using built-in swing-out (pivoting) USB connector 118. Note that auto ID device 100 may still be powered by a battery or charged through charging pin (not depicted), in addition to the USB connector charging described herein. Accordingly, auto ID device 100 has a separate battery compartment and battery can be replaced in the field by detaching the battery case 110.

Continuing then, with attention to FIGS. 1A-1F, inventive auto ID device 100 has a casement 101 for housing electronic circuitry (not depicted), with a recess 119 for pivoting USB connector 118 to reside within casement 101 when not in use, and for permitting pivoting USB connector 118 to swing out when needed for charging. Such electronic circuitry, illustratively for auto ID functions, may include circuitry found in the aforementioned compact bar code readers of the KDC® 100/200/300 type units, but in one optional embodiment, includes NFC-based payment processing circuitry or a Bluetooth® LE beacon for payment processing functionality. Inclusion of Bluetooth® LE beacons in auto ID device 100 may offer, in some embodiments, greater convenience for payment processing than NFC-based payment processing solutions because of the greater range available inherent in such beacons, and also because such systems normally exhibit a high degree of accuracy. Bluetooth® LE beacons, such as the iBeacon® available from Apple, Inc. of Cupertino, Calif., of the Gimbal® beacons available from Qualcomm, Inc. of San Diego, Calif., may be inserted within the circuitry of auto ID device 100. In either case, auto ID device 100 may be augmented through provision of payment processing authentication whereby a user may receive, either on auto ID device 100, or on an associated electronic device (tablet, smart phone, etc.) a request for payment, and a user can then confirm payment verification through use of a fingerprint reader and/or a PIN input to authorize payment. Additionally, auto ID device 100 may further be provisioned with geo-location functionality from the aforementioned Bluetooth LE beacons which provide for positioning location between a Bluetooth® LE-enabled auto ID 100 and target products or device that have Bluetooth® LE beacons associated therewith. Such an embodiment might be especially useful in say, logistics, retailing or warehousing environments where target products to be scanned might first need to be found through the geo-location functionality.

In one embodiment, the auto ID variant of the present invention may have unique set up buttons to enhance user operation. As illustratively depicted in FIGS. 1A-1F, there are four exemplary buttons (104) Up and Down buttons, (108) scan button, (112) erase button. Typical use of buttons in such an embodiment might include the following provision of: (i) a Scan or trigger button; (ii) an Up button, for Bluetooth® or other wireless connection/reconnection; (iii) a Down Button for Bluetooth® or other wireless disconnection, with a HID (Human Interface Device) toggle; (iv) an Erase button, for erasing previously scanned data; and (v) a Scan/Down button for turning on, off or resetting the device.

In addition, an optional, innovative centered (116) lanyard hole may be provided as depicted in FIGS. 1A-1F, which would allow auto ID device 100 to be viewed vertically from the front. Essentially, auto ID device 100 may be provided with centered lanyard hole (116) which offers a vertical orientation (e.g., screen-centric) axis, such that if one were to wear the device around the neck, the read-out from the screen can be readily viewed when hung by an attachment means such as a lanyard or the like.

FIGS. 2A-2B depict a mobile device (illustratively depicted as auto ID device 100), that has been manufactured according to an innovative process according to the present invention. Broadly speaking, the present invention further includes a process for bonding plastic component parts of a mobile device casement together without the need for prior art mechanical locking means such as screws and the like. Of particular novelty is the ability to employ UV bonding technology for the bonding plastic component parts of a mobile device casement together. UV bonding technology, such as that found in illustrative technologies like Loctite® 350 (available from Henkel Corp., of Rocky Hill, Conn.) is generally superior to mechanical locking means when joining plastic casement parts of mobile devices because of faster, cheaper assembly of casements, and also because of better resistance to moisture penetration of device seams. However, UV bonding technology of mobile device casements has, until now, been unknown simply because UV light must penetrate the plastic of the mobile device casement in order to effectuate the bonding of plastic component parts, and known casement parts are opaque in nature. To remedy this, and additionally, to accommodate the desire for an optionally customized, printed (opaque) front case 200, the innovative approach disclosed herein is to provide a transparent main frame 200, illustratively made from a transparent (clear injection) resin, so that an opaque printed front case 210 can be attached to transparent main frame 200, whereby the UV light of the UV bonding process can be directed through transparent main frame 200, for specifically bonding the plastic along a seam (not shown) where transparent main frame 200 and opaque printed front case 210 mate up. Simply stated, transparent main frame 200 allows the UV bonding light to pass through for bonding, as it cannot pass through opaque printed front case 210. When provided as such, the advantages of having a printed or customized front case 210 are retained, without the disadvantage of not being able to utilize superior UV bonding technology.

When provided in accordance with above, a custom design is provided for front case 210 of auto ID device 100, and in some embodiments, this custom design will include at least one type of opaque printing. Such custom designs are typically printed according to the various methods disclosed hereafter, but may also include optional effects such as additional rubbery or satin types of coatings on printed front case 210 may be included for purposes of design aesthetics and/or user functionality (such as user gripping, etc.). Alternatively, printed front case 210 may be formed from a transparent material, but is thereafter silk screen printed at say, an internal facing surface so as to provide a 3D effect. Accordingly, as described hereafter in one illustrative embodiment, there are several ways in which front case 210 can be customized through printing.

When printing onto the plastic, use of the proper chemical reactions is required so that the desired custom image becomes a non-removable part of front case 210 after processing is complete. To this end, the chemical properties of the various types of plastics that may be used to form front case 210, as well as the properties of different kinds of inks must be matched. If the incorrect ink is used to print the plastic of front case 210, then the image may flake or rub off. It is therefore imperative to integrate the ink into the very substance of the plastic of front case 210 in order to prevent rubbing off of the desired custom image. Properties of the plastic of front case 210 must be determined prior to printing, and the first step in one embodiment of the present invention is to determine the surface tension (that is, the surface bound energy of the chosen plastic) by testing the "dyne" level. On a scale of 1 to 100, it has been found that if the dyne level of the plastic used to form front case 210 is lower than 38, then the ink will peel off due to lack of complete drying. Generally, ink used for plastic needs a surface that has a high dyne level in order to soak in and adhere. However, problems with static electricity will occur if the dyne level is too high, say, above 50 dynes, as this may result in problems putting front case 210 through a printing press. As such, a dyne level of 38-50 is generally necessary to successfully print onto the types of plastic that may be used to form front case 210.

In one embodiment, pre-treating the plastic of front case 210 after the molding process, but prior to printing may further increase lasting ink adhesion as measured by tests known in the art of plastic printing. Such pre-treating involve methods that change (improve) the surface tension of the various types of plastics that may be used to form front case 210, and may include approaches such as open flame exposure, corona discharge, and/or chemical application. In one embodiment, flame treatment may provide better, longer lasting results for the various types of plastics that may be used to form front case 210. Such an illustrative approach involves passing front case 210 through automatic decorating machines with inline flamer station or the like in order to treat the plastic just prior to printing. This not only increases the dyne level for adhesion of ink but also cleans the surface of dust and dirt, and also eliminates static electricity that can cause spider webbing of the ink. The heat transferred to the plastic used to form front case 210 may, if desired, thin the viscosity of the ink for improved flow and gloss. Alternatively, corona discharge processing may be used, wherein electrical energy is employed to spark or arc so as to produce a halo of energy needed to alter the surface tension of plastic used to form front case 210 as it passes through this electrical discharge area on a conveyor or the like. Once flame treated or processed with a corona discharge, the plastic used to form front case 210 will hold the treatment for at least several years, depending on the type of plastic, climatic conditions, abrasion, and static electricity. Thereafter, the correct ink and/or catalyst is applied to plastic of front case 210, such that a chemical reaction transforms the liquid ink to a solid film integrated into the substance of the plastic of front case 210. In one embodiment, inks may have solvent bases known in the art of plastic printing for their capacity to bond chemically to various plastics, and accordingly, the solvents used will vary according to the chemical make-up of the particular plastic chosen to form front case 210. It should be noted that the aforementioned chemical reaction naturally converts one form of plastic turns into a chemically distinct variant thereof, thereby affording the opportunity to alter properties such as color, shape, and/or other physical properties.

In terms of applying the actual ink to the designated plastic chosen to form front case 210, there are many ways to imprint plastic according to different embodiments. For example, common techniques such as dye sublimation, epoxy dome, foil stamping, pad printing, and silkscreen printing, may be employed in various embodiments of the present invention. Screen-printing is generally a preferred embodiment for a front case 210 having flat surfaces, while pad printing, may be preferred for a front case 210 having irregular or textured surfaces (such as slip-resistant or grip surfaces), and foil stamping may be used for custom designs on front case 210 that may require metallic ink after printing. In any case, such printing processes essentially incorporate (imprint) inks into the plastic of front case 210, and make the imprint virtually impossible to remove. Depending on the ink chosen, some inks may require a bath in a fountain solution after printing and others may require dryer additives in the ink, while others may require a lengthy drying or curing time as known in the art of plastic imprinting. In at least one specific embodiment, UV light may be used to cure or dry the ink. Alternatively, application of heat, as well as infrared drying, may further be used in order to initiate the chemical chain reaction that will accelerate the absorption of ink into the plastic of front case 210. When accorded in this fashion, the resultant custom printing of front case 210 should be resistant to solvents, degreasers, alcohol, soap, water, and other chemicals.

Figure 3B:
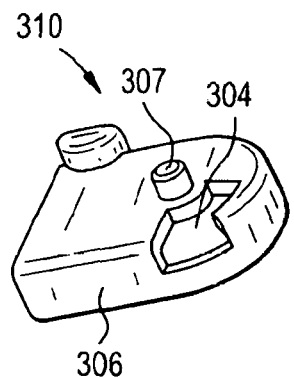
Figure 3C:
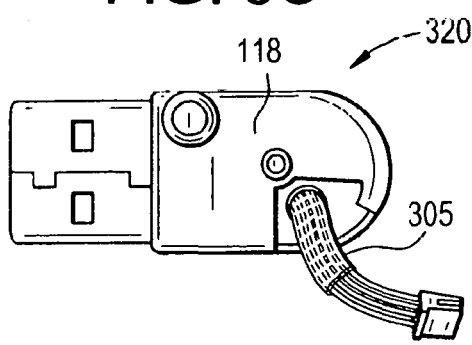
Figure 3D:
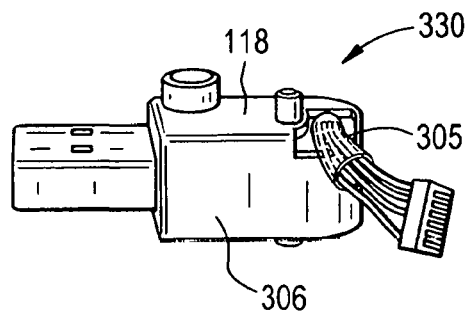

As shown illustratively in FIGS. 3A-3D, are an illustrative innovative swing-out (pivoting) USB connector 118 design, which is designed to maximize the reliability of USB connectors. In one embodiment of pivoting USB connector 118, both chemical bonding, as well as regular soldering (nodes) of wires 301 to USB board 302, are provided so as to afford a physically secure electrical connection 300 of USB wires or cable 301 and USB board 302. This physically secure electrical connection 300 of pivoting USB connector 118 includes or is augmented by reinforcement member 303 for improved mechanical securement of electrical wires 301 connecting the pivoting USB connector to the at least one USB port on the mobile device. Although reinforcement member 303 is illustratively depicted as having structure means defined by a plastic crossbar securely affixed across wires 301 and/or soldering nodes for physically reinforcing the structural integrity of the same against wear and tear and pulling, other means of clamping or securing the same are explicitly included herein (not depicted), whether by means of a clamp, zip tie, or plastic molding encasement. Highlighted at 310 is an anti-snag cutout 304 for preventing electrical wires 301 from destructive abrasion and/or electrical discontinuity during angular ("swing out") movement of pivoting USB connector 118 in relation to the mobile device (illustratively auto ID device 100), as indicated as a cutout or hole of USB PCB case of pivoting USB connector 118, which prevents wire cut during a swing out operation of pivoting USB connector 118. Typically, anti-snag cutout 304 will be cut out on a side wall 306 of USB PCB case of pivoting USB connector 118. Additionally, as indicated by the red circle call out in top view 320 and side view 330, wires 301 may be further protected from being cut or abraded during swing out operations by a inclusion of a protection tube, which may in one embodiment, be a contraction tube 305 surrounding or encasing wires 301. When not in use, pivoting USB connector 118 is typically resides or is swung in to recess 119 (not depicted in FIG. 3, but shown in FIG. 1) for compactness, convenience of use, and for protecting pivoting USB connector 118 from damage or being snagged. When in use or otherwise needed for charging of mobile device (illustratively auto ID device 100), pivoting USB connector 118 is swung out from recess 119 for access and insertion of the USB connector portion of pivoting USB connector 118 into a cooperating device for charging (not depicted). The swing out operation is effectuated, in one embodiment, through a pivot pin 307 for physically connecting said pivotably connecting USB connector to the mobile device, and pivot hinge 307 may have at least a first end for functional mating with an upper pivot pin end receptacle found within casement 101, and an optional second end for functional mating with said optional lower pivot pin end receptacle found within casement 101.

While the invention may be susceptible to various modifications and alternative forms, specific embodiments have been shown by way of example in the drawings and have been described in detail herein. However, it should be understood that the invention is not intended to be limited to the particular forms disclosed. Rather, other approaches to configuring the above are intended to be included within the spirit of the invention, and to this end, the invention is to cover all modifications, equivalents, and alternatives falling within the spirit and scope of the invention as defined by the following appended claims.

I claim:

1. A portable bar code scanner, said portable bar code scanner comprising:
    (a) electronic circuitry for executing bar code reading and at least one of the following of Near Field Communication (NFC) or beacon payment processing functions;
    (b) a casement for housing said electronic circuitry, said casement having:

(i) a transparent main frame; and (ii) a front case that is bonded to said transparent main frame, said plastic of said front case having a surface tension that is different from said transparent main frame.

2. The portable bar code scanner of claim 1, wherein said plastic of said printed front case is silk screened with an opaque printing and integrated ink and finish that is UV cured, and wherein said surface tension said plastic of said front case is between 38-50 dynes.

3. The portable bar code scanner of claim 2, wherein said casement includes an attachment hole provided on at least one end for vertical viewing of said portable bar code scanner when said portable bar code scanner is suspended vertically along a display axis.

4. A method for manufacturing a portable bar code scanner comprising at least the following steps of:

(a) providing electronic circuitry for executing bar code reading and at least one of the following of Near Field Communication (NFC) or beacon payment processing functions;

(b) manufacturing a casement for housing said electronic circuitry, said manufacturing comprising at least the following steps of:

(i) ejection molding a transparent main frame;

(ii) affixing said electronic circuitry to said transparent main frame;

(iii) ejection molding a front case from plastic, said plastic having a surface tension that is different from said transparent main frame;

(iv) bonding said front case to said transparent main frame though a directed beam of ultra-violet (UV) light through said transparent main frame to a bonding seam connecting said front case and said transparent main frame;

(v) screen printing said front case with custom design and finish using opaque printing and an integrated ink, through a UV light curing process;

(vi) curing said plastic of said front case having a surface tension that is different from said transparent main frame.

5. The portable bar code scanner of claim 4, wherein said plastic of said front case that is silk screened when said front case has a surface tension between 38-50 dynes.

\* \* \* \* \*